(12) United States Patent
Bordoz et al.

(10) Patent No.: US 6,758,252 B2
(45) Date of Patent: Jul. 6, 2004

(54) TIRE HAVING BEADS OF IMPROVED STRUCTURE

(75) Inventors: Francis Bordoz, Clermont-Ferrand (FR); Forrest Patterson, Orcines (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 21 days.

(21) Appl. No.: 10/335,831

(22) Filed: Jan. 2, 2003

(65) Prior Publication Data

US 2003/0136492 A1 Jul. 24, 2003

Related U.S. Application Data

(63) Continuation of application No. PCT/EP01/07125, filed on Jun. 22, 2001.

(30) Foreign Application Priority Data

Jul. 3, 2000 (FR) .............................................. 00 08649

(51) Int. Cl.[7] ........................... B60C 15/00; B60C 15/06
(52) U.S. Cl. ....................... 152/454; 152/539; 152/544; 152/547; 152/552
(58) Field of Search ................................. 152/539, 544, 152/547, 552, 454

(56) References Cited

U.S. PATENT DOCUMENTS

| | | | |
|---|---|---|---|
| 4,580,610 A | 4/1986 | Jackson | ........................ 152/516 |
| 6,571,846 B2 * | 6/2003 | Chandezon et al. | .... 152/544 X |

FOREIGN PATENT DOCUMENTS

| | | |
|---|---|---|
| EP | 0 678 404 A1 | 10/1995 |
| WO | WO 95/23073 | 8/1995 |
| WO | WO 99/64258 | 12/1999 |
| WO | WO 00/41902 | 7/2000 |

OTHER PUBLICATIONS

International Search Report for PCT/EP 01/07125, issued Nov. 6, 2001, see pp. 1,2.

* cited by examiner

Primary Examiner—Adrienne C. Johnstone
(74) Attorney, Agent, or Firm—E. Martin Remick; Alan A. Csontos; Martin Farrell

(57) ABSTRACT

A tire (1) comprising, viewed in meridian section, two beads (12) with generatrices which are inclined towards the outside, the upturn (130) of said reinforcement (13) being formed by the lateral (30) and radially inner (32) sides of a wedge-shaped profiled element (3) of high Shore A hardness and having an end located firstly axially to the outside of a straight line $P_2$ perpendicular to the axis of rotation and passing through the center of gravity of the annular anchoring element (14) and secondly axially to the inside and radially to the outside of the straight line $P_1$ passing through said center of gravity and forming with the axis of rotation an angle of between 30° and 60°, and the ratio $e_1/e_2$ of the thickness $e_1$ between the carcass reinforcement upturn (130) and the annular anchoring element (14) to the thickness $e_2$ between the carcass reinforcement upturn (130) and the outer wall of the bead, measured on the straight line $P_1$, satisfying the relationship:

$$0.05 \leq e_1/e_2 < 1.0.$$

2 Claims, 1 Drawing Sheet

TIRE HAVING BEADS OF IMPROVED STRUCTURE

CROSS-REFERENCE TO RELATED APPLICATIONS

This application is a continuation of International Application No. PCT/EP01/07125, filed Jun. 22, 2001.

BACKGROUND

The present invention relates to a tire intended to be mounted on a rim having at least one first frustoconical seat, the generatrix of which has an axially outer end which is closer to the axis of rotation than the axially inner end.

Such a tire is described in PCT Application WO 94/13498 that is owned by the assignee of the present invention. It comprises at least a first bead, which is intended to be mounted on said first rim seat which is inclined towards the outside, said first bead, of conventional axial width, which terminates axially to the outside in a bead toe, having a bead seat, the generatrix of which has its axially outer end closer to the axis of rotation than its axially inner end, said generatrix being extended axially to the outside by an outer face defining the bead toe, said face forming with the axis of rotation an angle γ, which is open radially and axially towards the outside, of less than 90°. The radial carcass reinforcement of said tire, which is anchored within each bead to at least one inextensible annular reinforcement element, has a meridian profile which, when the tire is mounted on its operating rim and inflated to its operating pressure, has a direction of curvature which is constant in the sidewalls and bead which terminates in the toe, such that in said bead a line tangent to a point of tangency of said profile with the inextensible annular element of said bead forms an angle ø with the axis of rotation which is open towards the outside of at least 70°.

The bead of such a tire, and more particularly the structure of the anchoring of the carcass reinforcement, may be variable. In international application WO 95/23073 that is owned by the assignee of the present invention, the radial carcass reinforcement is anchored to the inextensible element by winding around said element from the heel to the toe of the bead to form an upturn extending into a wedge-shaped profiled element of rubber mix defined by two sides starting from an apex A located beneath the section of the coated bead wire, the radially outer side forming, with a line parallel to the axis of rotation passing through said apex A, an acute angle $ø_1$, which is open radially and axially towards the outside and is between 20° and 70°, and the radially inner side forming with said parallel line an acute angle $ø_2$, which is open radially towards the inside and is between 0° and 30°, and the rubber mix forming the profiled element, axially adjacent to the bead wire, having a Shore A hardness equal to at least 65 and greater than the Shore A hardness of the rubber mixes axially and radially above the bead wire and the profiled element.

In order to overcome the propagation towards the bead wire of cracks which begin in the outer protective layer of the bead, unpublished application PCT/EP99/10472 provides for precise location of the end of the carcass reinforcement upturn, said upturn reinforcing at least the wedge-shaped rubber profiled element which is located axially to the outside of the anchoring bead wire. Said wedge-shaped profiled element is formed of a rubber mix of greater hardness than the hardness of the rubber mixes radially above respectively the annular anchoring element and said profiled element.

Although they have solved the major problem of the propagation of cracks, the structures described above do not provide a valid solution to the initiation of said cracks, the cracks in the bead-protecting mix occur too soon in the life of the tire. Said structures furthermore have certain not insignificant drawbacks, in particular from the point of view of on the road handling crispness of passenger vehicles equipped with large tire sizes: the road holding of the vehicle under the effect of the transverse and longitudinal forces needs to be improved.

An object of the invention is to overcome the drawbacks above while preserving the excellent properties of anti-unseating of the beads of the tire from the operating rim, providing a tire which remains seated on the rim.

SUMMARY OF THE INVENTION

The tire in accordance with the invention as viewed in meridian section, comprises, a radial carcass reinforcement, two beads, each bead having a seat the generatrix of which is inclined towards the outside and a heel axially to the inside, reinforced by at least one inextensible annular element around which the carcass reinforcement is wound, extending from said heel to the toe of said bead to form an upturn, whereas the axially inner toe comprises a profiled element of rubber mix of a Shore A hardness of at least 65 and in the form of a wedge defined by three sides, two of which have originated from an apex A located beneath the annular element, the carcass reinforcement upturn being formed by the lateral and radially inner sides of said wedge-shaped profiled element and having an end located firstly axially to the outside of a straight line $P_2$ perpendicular to the axis of rotation and passing through the center of gravity of the meridian section of the annular anchoring element and secondly axially to the inside and radially to the outside of the straight line $P_1$ passing through said center of gravity and forming with the axis of rotation an angle open axially and radially towards the outside of between 30° and 60°, is characterized in that at least one of the profiled elements of rubber mixes filling the space between the main part of the carcass reinforcement and its upturn and radially above the annular element and the wedge-shaped profiled element has a Shore A hardness at least equal to the hardness of the rubber mix forming said wedge-shaped profiled element, the ratio $e_1/e_2$ of the thickness $e_1$ between the carcass reinforcement upturn and the annular anchoring element to the thickness $e_2$ between the carcass reinforcement upturn and the outer wall of the bead, measured on the straight line $P_1$, satisfying the relationship $$0.05 \leq e_1/e_2 \leq 1.0.$$

"Generatrix inclined towards the outside" is understood to mean a generatrix, the axially inner end of which lies on a circle of diameter greater than the diameter of the circle on which the axially outer end is located. "Diameter of an inclined seat" refers to the diameter of the circle on which is located the end of its generatrix farthest from the axis of rotation, the tire preferably has two seats which are said to be inclined towards the outside and are of different diameters.

The meridian profile of the carcass reinforcement, when the tire is mounted on its operating rim and inflated to its operating pressure, has a direction of curvature which is constant at least in the first bead and the sidewall which extends it radially, and the tangent TT' to the point of tangency T of said profile with the annular reinforcement element of said bead forms with the axis of rotation an angle ø which is open towards the outside of at least 70°.

BRIEF DESCRIPTION OF THE DRAWING

The invention will be better understood with reference to the drawing attached to the description, which illustrates a non-limiting example of embodiment of a tire according to the invention, and which, associated with a suitable rim, forms a high-performance tire/rim assembly.

DETAILED DESCRIPTION

Figure 1:
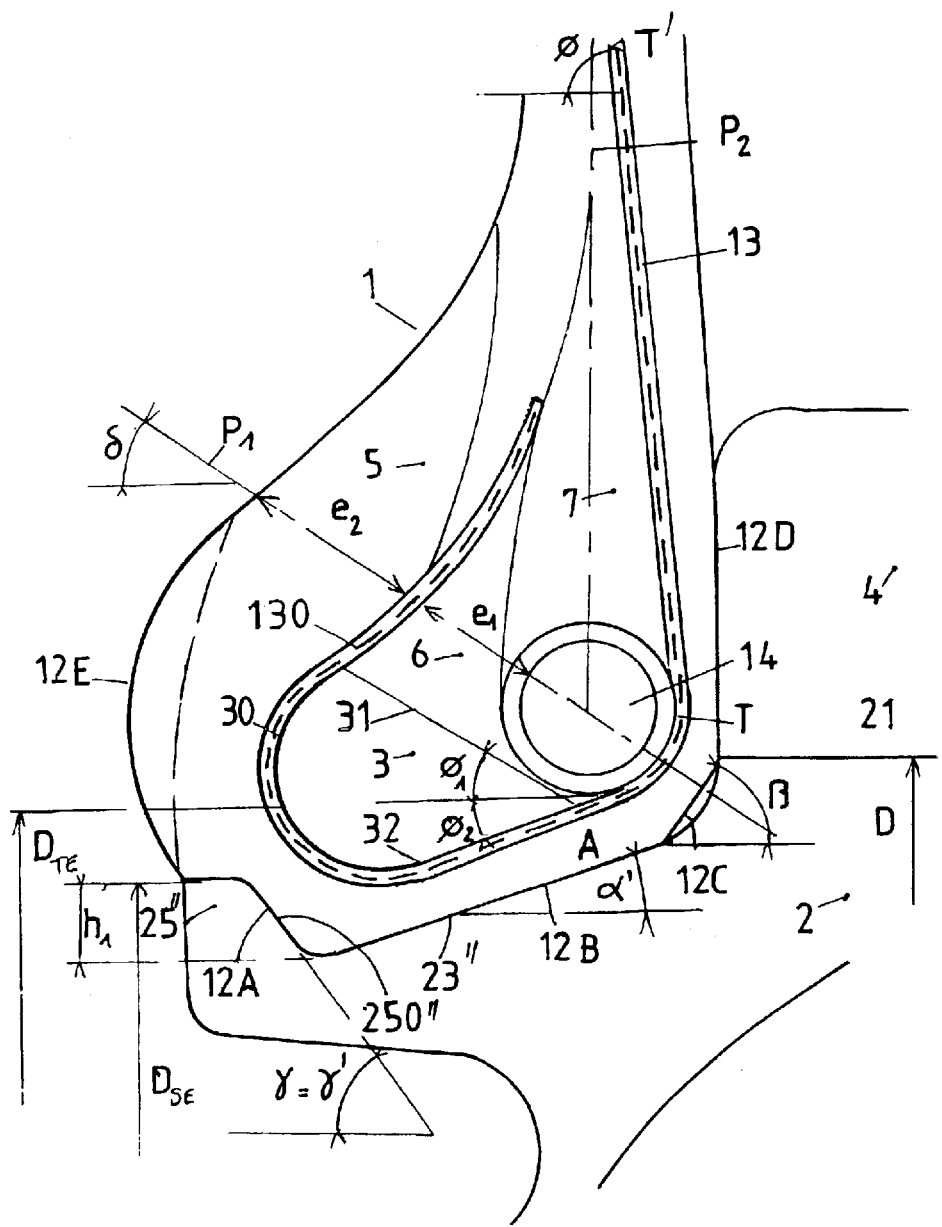
FIG. 1 is a diagram of a bead of a tire according to the invention, mounted on the seat of its mounting rim.

The rim 2 on which the tire 1 will be mounted is formed mainly of two frustoconical seats, the generatrices of which form with the axis of rotation an angle α' which is open towards the outside of the tire, of between 4° and 30° and in the example described equal to 14°, less than the angle of the corresponding generatrices of the seats of the beads 12 of the tire. Said seats thus have axially outer ends on circles of smaller diameters than those of the circles on which the axially inner ends are located. The seat 23", which is located for example on the outer side of the vehicle, is extended axially to the outside by a protrusion or hump 25", the inner face 250" of which forms with the axis of rotation an angle γ', the diameter $D_{SE}$ of which is less than the internal diameter $D_{TE}$ of the bead wire 14 for reinforcing the bead which is intended to be mounted on said seat, and the height $h_1$ of which, measured relative to the axially outer end of the rim seat 23", is a height comparable to the height of the humps or protrusions used axially to the inside of conventional, standardized passenger-car rims.

On the side located on the outside of the vehicle, the rim seat 23" is connected to a cylindrical portion 21 on which a bearing support 4 for the tread will come to rest. The diameter of the cylindrical portion 21 is the nominal diameter D of the rim 2.

The contour of the bead 12, mounted on the seat 23", comprises, axially to the inside, a wall 12D substantially perpendicular to the axis of rotation, which wall may bear laterally on the axially outer face of the support ring 4. Said wall 12D of the bead 12 is extended axially to the outside by a frustoconical generatrix 12C, which forms with a line parallel to the axis of rotation an angle β of 45° which is open axially towards the inside and radially towards the outside. Said generatrix 12C is itself extended axially to the outside by a second frustoconical generatrix 12B of the bead seat forming with the direction of the axis of rotation an angle α of 15°, which is open axially towards the inside and radially towards the outside. Said generatrix 12B is said to be inclined towards the outside, its axially outer end being on a circle of diameter less than the diameter of the circle on which its axially inner end is located. A frustoconical generatrix 12A, extending the generatrix 12B axially to the outside and forming with the direction of the axis of rotation an angle of γ of 45°, which is open axially and radially towards the outside, finishes off the contour of the base of the bead 12. The wall 12E, which is curved in the example described and is of substantially perpendicular general orientation to the direction of the axis of rotation of the rim, completes the contour of the bead 12. Whereas the generatrix 12B will bear on the rim seat 23", which is inclined towards the outside, the generatrix 12A will bear on the axially inner wall 250" of the protrusion or hump 25" of the rim 2, which is inclined by the angle γ', which is equal to the angle γ of the generatrix 12A. The portion of the bead adjacent to the wall 12D and to the generatrix 12C, forms, viewed in meridian section, the heel of the bead 12. The portion of the bead adjacent to the generatrix 12B, to the generatrix 12A and partially to the wall 12E constitutes the toe of the bead 12.

The heel of the bead 12 is reinforced by the anchoring bead wire 14 of the carcass reinforcement 13, which bead wire is coated with a rubber mix of high Shore A hardness. The toe of the bead 12 comprises a profiled element 3, arranged axially to the outside of the anchoring bead wire 14 of the carcass reinforcement 13. This profiled element 3 is in the shape of a substantially circular sector with an apex or center A located radially beneath the bead wire 14, two sides or radii 31 and 32 starting from said apex A, and a third side 30, opposite the apex A. The radially outer side or radius 31 forms with line parallel to the axis of rotation an angle $ø_1$, which is open radially and axially towards the outside, of 45°, whereas the radially inner side or radius 32 forms with the same parallel line an angle $ø_2$, which is open radially towards the inside and axially towards the outside, of 15°. This profiled element 3 is formed of a rubber mix having in the vulcanized state a Shore A hardness of at least 65 and in the present case equal to 94, said hardness being measured in accordance with the standard ASTM D67549T.

The coated bead wire 14 is surmounted radially to the outside by a profiled element 7 of rubber mix of a high Shore A hardness. Radially to the outside of the profiled element 3 and axially to the outside of said profiled element 7 there is arranged a third profiled element 6 of rubber mix having a Shore A hardness equal to that of the profiled element 7 and therefore equal to the hardness of the mix of the profiled element 3, which makes it possible to increase in particular the transverse and longitudinal rigidities of the beads while retaining, when the tension of the carcass reinforcement increases, the creation of compression of the profiled element 3 and self-clamping of the toe of the bead on the mounting rim 2, whereas, in the case described, the initial clamping of the bead 12 on said rim is virtually zero, owing to the virtual equality of the angles α and α' and the larger diameters of the rim and bead seats. The protector 5 finishes off the bead 12.

The carcass reinforcement 13 has a meridian profile, when the tire is mounted on its operating rim and inflated to its operating pressure, which has a direction of curvature which is constant over its entire length, and is such that the tangents TT' to the points of tangency T of said profile with the coated bead wires 14 of the beads 12 form with the axis of rotation angles φ which are open axially and radially towards the outside and are equal to 80°. Said carcass reinforcement 13 is wound around the coated bead wire 14 from the heel to the toe of the bead 12, or from the inside to the outside, to form an upturn 130 which extends along the radially inner side 32 of the profiled element 3, then along the side 30 opposite the apex A, then covering at least in part the axially and radially outer side of the profiled element 6 radially to the outside of the profiled element 3. The end of the upturn 130 is radially located above the bead wire 14, and axially located between the two straight lines $P_1$ and $P_2$, the straight line $P_1$ being the straight line passing through the center of gravity of the meridian section of the bead wire 14 and forming with the axis of rotation an angle δ open axially and radially towards the outside of 45°, the straight line $P_1$ being perpendicular to the frustoconical generatrix 12C of the bead heel, and the straight line $P_2$ being a straight line perpendicular to the axis of rotation and passing through said center of gravity. The carcass reinforcement upturn 130 has a meridian profile such that the ratio of thickness $e_1$ to thickness $e_2$ is approximately equal to 0.8, the thickness $e_1$ being the thickness of rubber mix between the axially inner face of the upturn 130 of the carcass reinforcement 13 and the metallic face of the bead wire 14, whereas the thickness $e_2$ is the thickness of rubber mix between the axially outer face of the upturn 130 and the outer wall of the bead, the two thicknesses $e_1$ and $e_2$ being measured on the straight line $P_1$ defined above. The upturn 130, thus structured in combination with the high hardnesses of the rubber mixes which surround it, thus has a sufficient length to have good strength with respect to the unwinding of the carcass reinforcement, while making it possible to delay the appearance of the cracks in the outer layer 5 of the bead 12, without the rate of propagation of said cracks being significantly adversely affected.

We claim:

1. A tire (1) having a radial carcass reinforcement (13) comprising, when viewed in meridian section, two beads (12), each bead having a seat (12B) the generatrix of which is inclined towards the outside, and a heel axially to the inside, said bead having at least one inextensible annular reinforcing element (14) around which said carcass reinforcement (13) is wound and said carcass reinforcement extends from said heel to a toe of said bead to form an upturn (130), a plurality of outer profiled elements (6, 7) filling the space between a main part (13) and said upturn (130) of said carcass reinforcement (13) and located radially above said annular reinforcing element (14), and an axially inner toe further comprising an wedge-shaped profiled element (3) of a rubber mix having a Shore A hardness of at least 65; wherein said wedge-shaped profiled element is defined by three sides (30, 31, 32), two (31, 32) of the sides of said wedge-shaped element originate from an apex A located beneath said annular reinforcing element (14);

and said upturn (130) of said carcass reinforcement (13) being formed by the lateral (30) and radially inner (32) sides of said wedge-shaped profiled element (3), and said upturn further having an end located firstly axially to the outside of a straight line $P_2$ perpendicular to the axis of rotation and passing through the center of gravity of the meridian section of said annular anchoring element (14) and secondly axially to the inside and radially to the outside of a straight line $P_1$ passing through said center of gravity and said straight line $P_1$ forming with the axis of rotation an angle δ open axially and radially towards the outside of between 30° and 60°; said tire characterized in that at least one of said outer profiled elements (6, 7) has a Shore A hardness at least equal to the hardness of the rubber mix forming said wedge-shaped element (3); and a ratio $e_1/e_2$ of a thickness $e_1$ between said carcass reinforcement upturn (130) and said annular anchoring element (14) to a thickness $e_2$ between said carcass reinforcement upturn (130) and the outer wall of the bead, measured on the straight line $P_1$, satisfies the relationship:

$$0.05 \leq e_1/e_2 \leq 1.0.$$

2. A tire according to claim 1, characterized in that said tire has two seats having different diameters and inclined towards the outside.

* * * * *